United States Patent
Wang

(10) Patent No.: US 8,606,098 B1
(45) Date of Patent: Dec. 10, 2013

(54) ELECTRONIC DEVICE WITH TWO CAMERA MODULES

(75) Inventor: Man-Zhong Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/593,537

(22) Filed: Aug. 24, 2012

(30) Foreign Application Priority Data

Jul. 24, 2012 (CN) .......................... 2012 1 0257187

(51) Int. Cl.
*G03B 17/02* (2006.01)
(52) U.S. Cl.
USPC .......................................... 396/535; 348/374
(58) Field of Classification Search
USPC .................................... 396/535; 348/373, 374
See application file for complete search history.

(56) References Cited

U.S. PATENT DOCUMENTS

| | | | |
|---|---|---|---|
| 7,619,683 B2* | 11/2009 | Davis | 348/374 |
| 2004/0228075 A1* | 11/2004 | Moriguchi et al. | 361/680 |
| 2011/0075999 A1* | 3/2011 | Chiu | 396/55 |
| 2011/0193775 A1* | 8/2011 | Lee et al. | 345/157 |
| 2012/0008935 A1* | 1/2012 | Cheng et al. | 396/535 |
| 2012/0093494 A1* | 4/2012 | Wang et al. | 396/72 |
| 2013/0033584 A1* | 2/2013 | Seo et al. | 348/47 |

* cited by examiner

*Primary Examiner* — Clayton E LaBelle
*Assistant Examiner* — Warren K Fenwick
(74) *Attorney, Agent, or Firm* — Altis Law Group, Inc.

(57) ABSTRACT

An electronic device of reduced thickness includes a housing with a front cover and a back cover, a circuit board accommodated in the housing, a flexible circuit board electrically connected to the circuit board, a first camera module, and a second camera module. The flexible circuit board strip is folded to create a substantially U-shaped portion defining a first receiving space facing the front cover and a second receiving space separated from the first receiving space. The first camera module comprising a first lens module received in the first receiving space and electrically connected to the flexible circuit board strip. The second camera module includes a second lens module received in the second receiving space and electrically connected to the flexible circuit board strip. The second camera module is juxtaposed alongside of the first camera module and invertedly oriented with respect to the first camera module.

9 Claims, 5 Drawing Sheets

ELECTRONIC DEVICE WITH TWO CAMERA MODULES

BACKGROUND

1. Technical Field

The present disclosure relates to an electronic device coupling to two camera modules.

2. Description of Related Art

A front camera module and a back camera module are often provided in portable electronic devices, such as mobile phones and tablet computers. Electronic devices with such two camera modules in related art may use two flexible circuit board strips for electrically connecting the two camera modules to a circuit board of the electronic device. There is a need in the art to provide an electronic device with a reduced thickness where there is a plurality of camera modules.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure are described with reference to the accompanying drawings.

Figure 1:
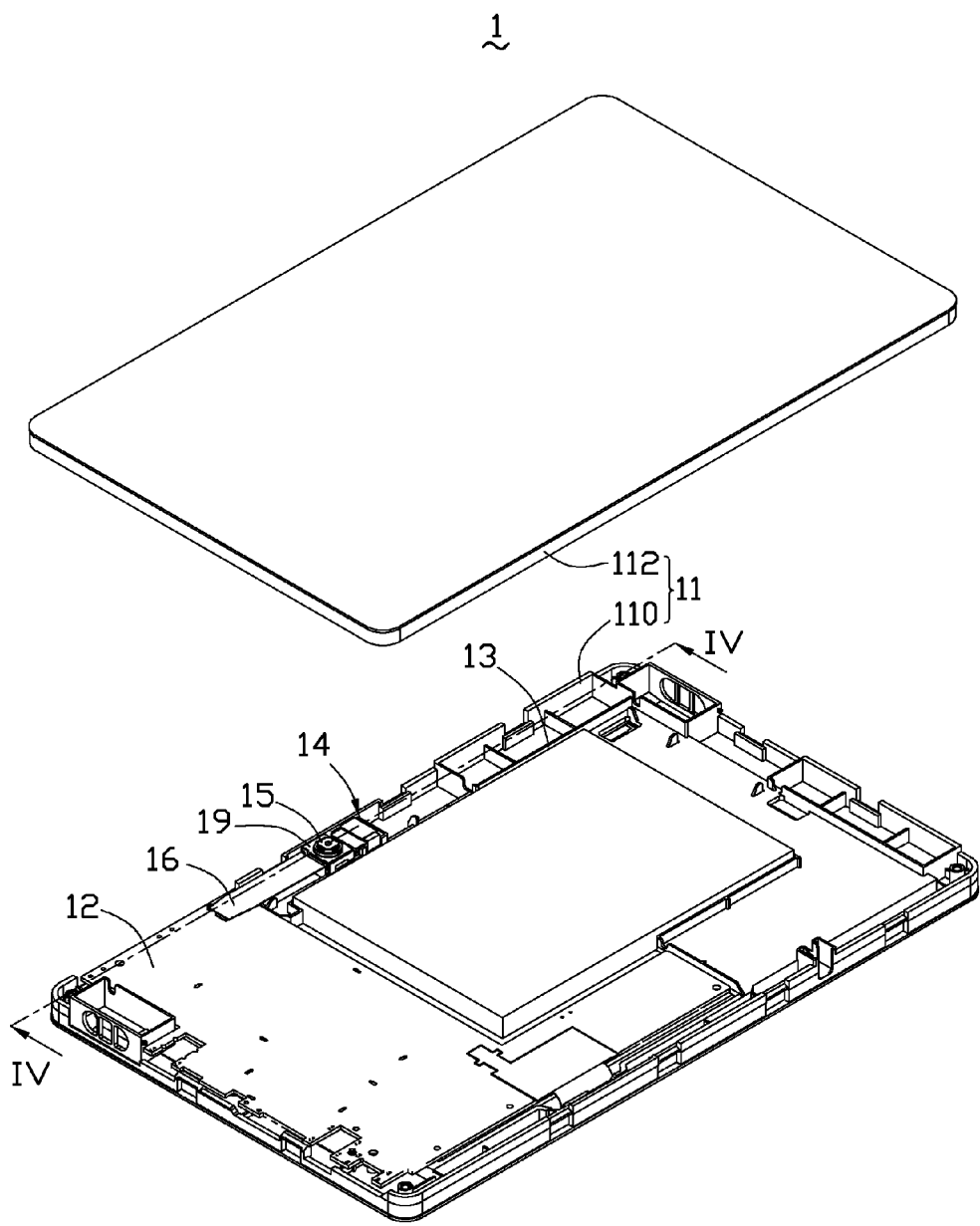
FIG. 1 is an isometric view of an electronic device in accordance with a first exemplary embodiment.

FIG. 1 illustrates an electronic device 1 in accordance with a first exemplary embodiment. The electronic device 1 includes a housing 11, a circuit board 12, a battery 13, a first camera module 14, a second camera module 15, a flexible circuit board strip 16, and a number of pairs of board to board connectors 17. In the embodiment, the electronic device 1 may be a mobile phone or a tablet computer. The housing 11 includes a front cover 110 and a back cover 112.

The circuit board 12 and the battery 13 are accommodated in the housing 11. The circuit board 12 is substantially coplanar with the battery 13, thereby decreasing the thickness of the electronic device 1.

Figure 2:
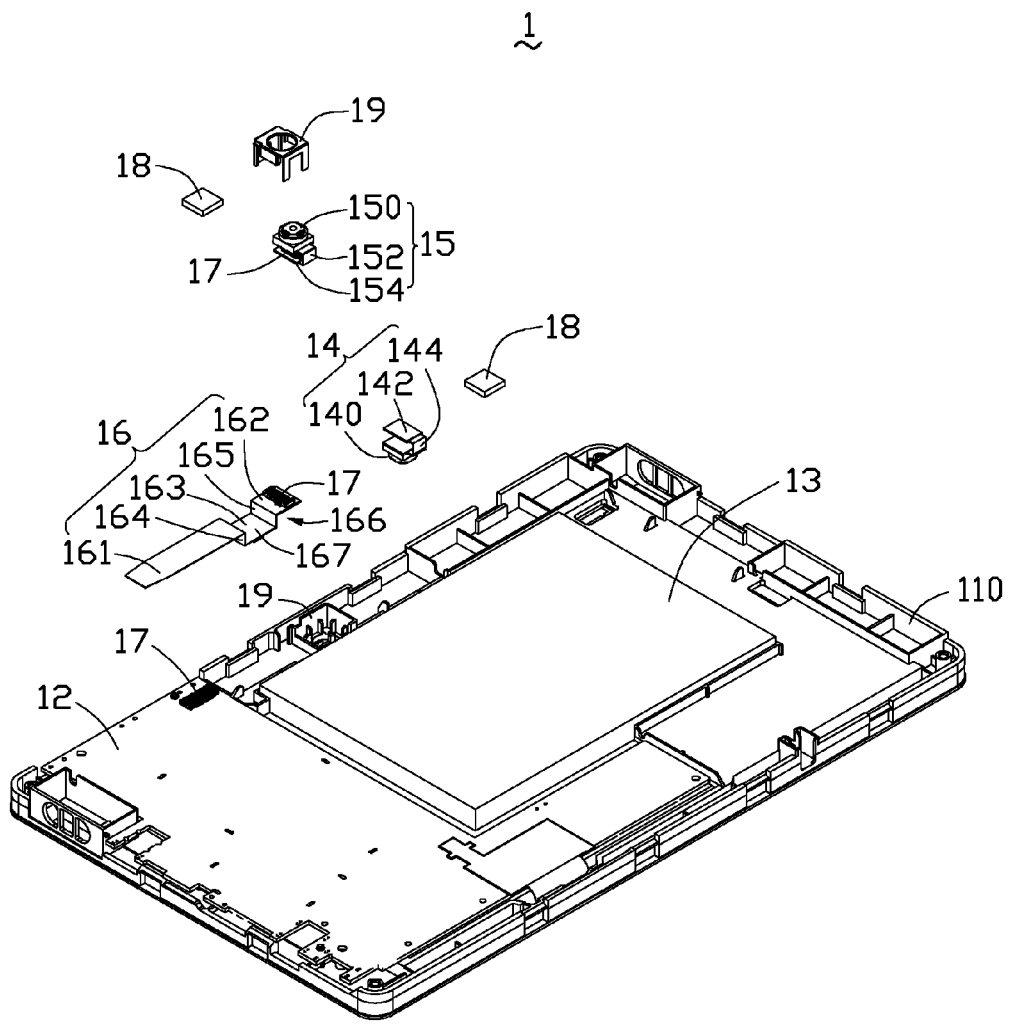
FIG. 2 is an exploded, isometric view of the electronic device of FIG. 1.
Figure 3:
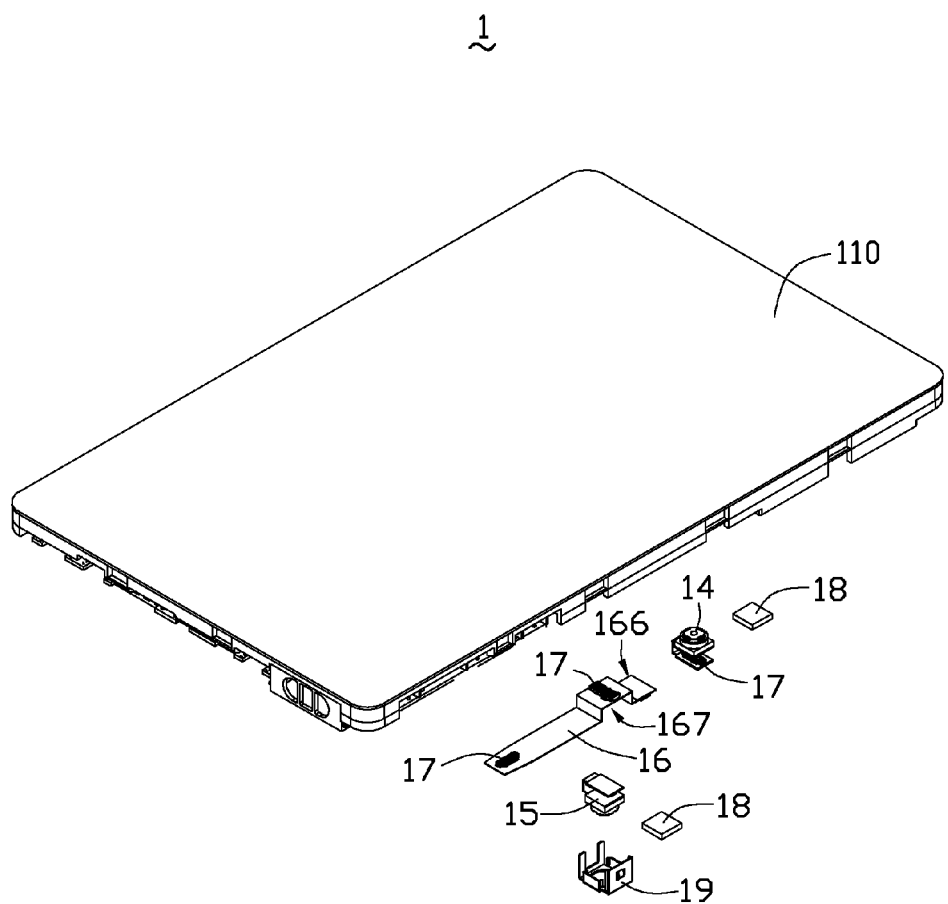
FIG. 3 is similar to FIG. 2, but viewed from a reverse perspective.
Figure 4:
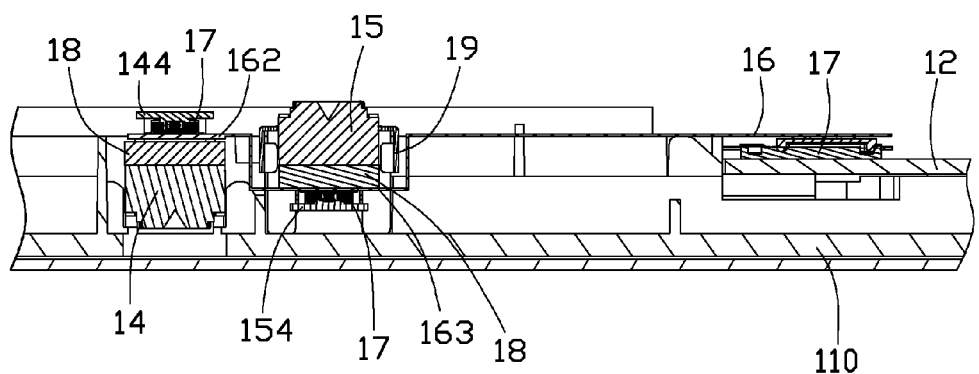
FIG. 4 is a cross-sectional view of the electronic device, along IV-IV of FIG. 1.

Referring to FIGS. 2-4, the flexible circuit board strip 16 includes a first horizontal portion 161, a second horizontal portion 162, and a third horizontal portion 163 between the first horizontal portion 161 and the second horizontal portion 162. The flexible circuit board strip 16 also includes a first vertical portion 164 connected to the first horizontal portion 161 and the third horizontal portion 163, and a second vertical portion 165 connected to the second horizontal portion 162 and the third horizontal portion 163. The third horizontal portion 163, the first vertical portion 164, and the second vertical portion 165 cooperatively define a U-shaped portion. The second horizontal portion 162 and the second vertical portion 165 cooperatively define a first receiving space 166 facing the front cover 110. The first vertical portion 164, the second vertical portion 165, and the third horizontal portion 163 cooperatively define a second receiving space 167 facing the back cover 112. The second camera module 15 is juxtaposed alongside of the first camera module 14 and invertedly oriented with respect to the first camera module 14. In assembly, the first horizontal portion 161 is electrically connected to the circuit board 12 via a first pair of board to board connectors 17.

The first camera module 14 includes a first lens module 140, a first panel 142 parallel to the second horizontal portion 162, and a first flexible circuit board 144 electrically connecting the first lens module 140 and the first panel 142. The first lens module 140 is received in the first receiving space 166, and the first panel 142 is electrically connected to, the second horizontal portion 162 via a second pair of board to board connectors 17. Then, the first camera module 14 may capture images of objects in front of the housing 11 and transmit the data to the circuit board 12 via the flexible circuit board strip 16.

The second camera module 15 includes a second lens module 150, a second panel 152 parallel to the third horizontal portion 163, and a second flexible circuit board 154 electrically connecting the second lens module 150 and the second panel 152. The second lens module 150 is retained within the second receiving space 167 of the flexible circuit board strip 16, and the second panel 152 is electrically connected to the third horizontal portion 163 via a second pair of board to board connector 17. Then, the second camera module 15 may capture images of objects at the back of the housing 11 and transmit the signal to the circuit board 12 via the flexible circuit board strip 16.

The electronic device 1 further includes two support plates 18 and two shielding members 19. The support plates 18 are positioned between the first lens module 140 and the third horizontal plate 163, and between the second lens module 150 and the second horizontal plate 162.

The shielding members 19 include sidewalls surrounding the first lens module 140 and the second lens module 150. The shielding members 19 are then fixed to the housing 11, thereby retaining the first camera module 14 and the second camera module 15 in their respective places within the first receiving space 166 and the second receiving space 167.

Figure 5:
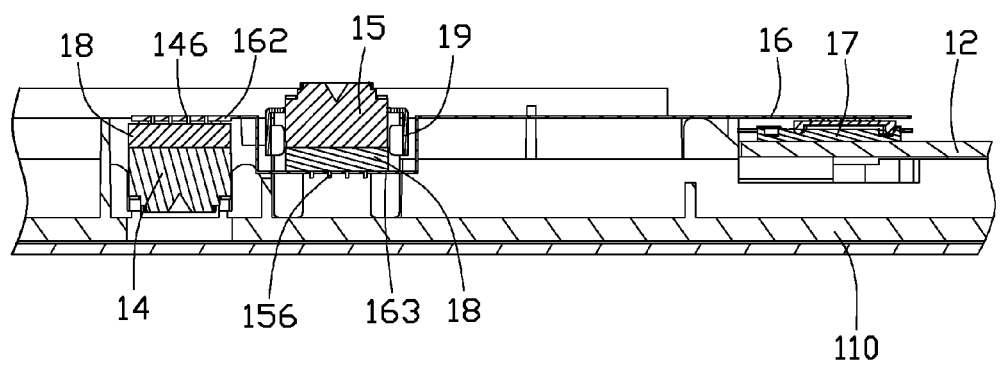
FIG. 5 is a cross-sectional view of the electronic device in accordance to a second exemplary embodiment.

Referring also to FIG. 5, in a second exemplary embodiment, the first camera module 14 only includes the first lens module 140 and a number of first terminals 146 protruding from the first lens module 140, and the second camera module 15 only includes the second lens module 150 and a number of second terminals 156 protruding from the second lens module 150. The first terminals 146 and the second terminals 156 are soldered to the flexible circuit board strip 16 and electrically connected to the circuit board 12 via the flexible circuit board strip 16.

In the present disclosure, the first lens module 140 is retained within the first receiving space 166, the second lens module 150 is retained within the second receiving space 167, and the first camera module 14 and the second camera module 15 are electrically connected to the circuit board 12 via the flexible circuit board strip 16, thereby providing a significantly reduced thickness of the electronic device 1.

While various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An electronic device comprising:
   a housing comprising a front cover and a back cover;
   a circuit board accommodated in the housing;
   a flexible circuit board strip electrically connected to the circuit board, the flexible circuit board strip being folded to create a substantially U-shaped portion defining a first receiving space facing the front cover and a second receiving space separated from the first receiving space;
   a first camera module comprising a first lens module received in the first receiving space and electrically connected to the flexible circuit board strip, the first camera module facing the front cover; and
   a second camera module comprising a second lens module received in the second receiving space and electrically connected to the flexible circuit board strip, the second camera module being juxtaposed alongside of the first camera module and invertedly oriented with respect to the first camera module, the second camera module facing the back cover.

2. The electronic device as described in claim 1, further comprising a battery accommodated in the housing and substantially coplanar with the circuit board.

3. The electronic device as described in claim 1, wherein the flexible circuit board strip comprises:
   a first horizontal portion electrically connected to the circuit board;
   a second horizontal portion electrically connected to the first camera module;
   a third horizontal portion electrically connected to the second camera module;
   a first vertical portion perpendicularly connecting the first horizontal portion and the third horizontal portion; and
   a second vertical portion perpendicularly connecting the second horizontal portion and the third horizontal portion;
   the second horizontal portion and the second vertical portion cooperatively define the first receiving space, and the U-shaped portion comprises the first vertical portion, the third horizontal portion, and the second vertical portion.

4. The electronic device as described in claim 3, wherein the first horizontal portion is electrically connected to the circuit board via a first pair of board to board connectors.

5. The electronic device as described in claim 3, wherein the first camera module comprises a first panel parallel to the second horizontal portion and a first flexible circuit board electrically connecting the first panel to the first lens module, and the first panel is electrically connected to the second horizontal portion via a second pair of board to board connectors.

6. The electronic device as described in claim 3, wherein the first camera module comprises a plurality of first terminals protruding from the first lens module, and the plurality of first terminals are soldered to the second horizontal portion.

7. The electronic device as described in claim 3, wherein the second camera module comprises a second panel parallel to the third horizontal portion and a second flexible circuit board electrically connecting the second panel to the second lens module, and the second panel is electrically connected to the third horizontal portion via a third pair of board to board connectors.

8. The electronic device as described in claim 3, wherein the second camera module comprises a plurality of second terminals protruding from the second lens module, and the plurality of second terminals are soldered to the third horizontal portion.

9. The electronic device as described in claim 1, further comprising two shielding members fixed to the housing for respectively retaining the first lens module and the second lens module within the first receiving space and the second receiving space.

* * * * *